D. W. BLUNDELL, J. H. MILLS & A. T. MAGUIRE.
ARTIFICIAL TOOTH.
APPLICATION FILED JAN. 4, 1912.
1,211,817.
Patented Jan. 9, 1917.
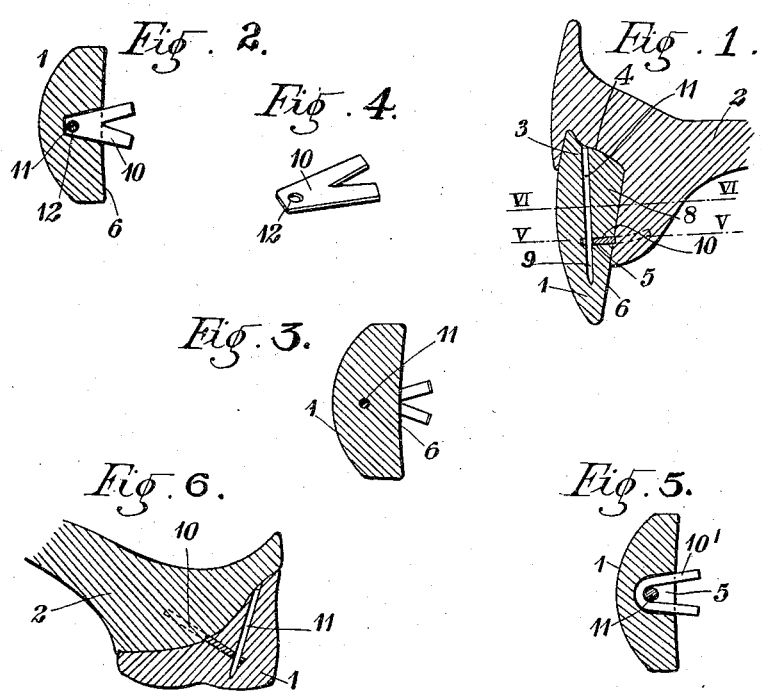
WITNESSES:
INVENTORS:
David William Blundell
John Henry Mills
Alfred Thomas Maguire
BY
THEIR ATTORNEY IN FACT.

UNITED STATES PATENT OFFICE.

DAVID WILLIAM BLUNDELL AND JOHN HENRY MILLS, OF EAST MOLESEY, AND ALFRED THOMAS MAGUIRE, OF LONDON, ENGLAND, ASSIGNORS TO BRITISH DIATORIC MANUFACTURING COMPANY LIMITED, OF EAST MOLESEY, ENGLAND.

ARTIFICIAL TOOTH.

1,211,817.   Specification of Letters Patent.   Patented Jan. 9, 1917.

Application filed January 4, 1912.  Serial No. 669,430.

*To all whom it may concern:*

Be it known that we, DAVID WILLIAM BLUNDELL, JOHN HENRY MILLS, and ALFRED THOMAS MAGUIRE, subjects of the King of England, DAVID WILLIAM BLUNDELL and JOHN HENRY MILLS, residents of East Molesey, in the county of Surrey, and ALFRED THOMAS MAGUIRE, resident of 40 Bow Road, in the county of London, England, have invented new and useful Improvements in or Relating to Artificial Teeth, of which the following is a specification.

This invention relates to artificial teeth and has for its object to provide improved constructions of teeth which can be easily and cheaply manufactured and which permit of them being very firmly secured to a backing or plate for the purpose of forming a denture.

The important feature of our invention consists in the methods which we employ for securing the anchoring pins in what are known as "detachable" pin teeth in which the anchoring pin is inserted in a cavity in the tooth after the latter has been baked.

In order that the invention may be clearly understood we will now proceed to describe the same with reference to the accompanying drawings, in which—

Figure 1 is a sectional view of an artificial tooth attached to a backing with the aid of an anchoring pin which is secured to the tooth in accordance with our invention. Figs. 2 and 3 are sections of the tooth on lines V, V and V¹, V¹, respectively of Fig. 1 before the same has been mounted on the backing. Fig. 4 is a perspective view of the anchoring pin. Fig. 5 is a view similar to Fig. 2 showing an anchoring pin of somewhat different form and Fig. 6 is a view illustrating the invention applied to a molar tooth.

In the drawings, the tooth is indicated at 1 and the backing or plate at 2. The tooth is formed with a cavity 3 extending from the part 4 which may be termed the root of the tooth through the greater portion of its length and with a horizontal passage 5 which extends from the cavity 3 to the back or lingual surface 6 of the tooth and receives an anchoring pin 10. This pin, as will be seen from Figs. 2 and 4, is substantially flat and is provided with two prongs forming a convenient means of attaching the tooth to the backing, although anchoring pins of other shapes may be employed if desired. Said anchoring pin is held in position by a locking pin 11 which is located in the longitudinal cavity 3. This cavity 3 extends beyond the passage 5 and consequently the locking pin 11 which passes through an orifice 12 in the anchoring pin 10 abuts against the material of the tooth above and below the anchoring pin and holds the latter securely in position.

The tooth is attached to the backing or base in the usual manner and during the process of vulcanization the parts of the cavity 3 and horizontal passage 5 which are not occupied by the anchoring pin and locking pin respectively will be filled with the material of which the backing is composed, the main strength of the anchorage being however obtained by means of the anchoring pin. It will be obvious, and it is also clear from the drawing that the cavities 3 and 5 need only be a very little larger than the sizes of the pins which they are to contain. The thickness of the tooth will therefore be sufficient to prevent any possible discoloration or darkening of the same by reason of the presence of the pin or material of the backing within its cavity. It will be furthermore observed that with this construction of tooth, the bridge piece 8 above the anchoring pin (see Fig. 1) is very strong and is well able to withstand the strain due to the pressure of the locking pin at this point.

Referring now to Fig. 5, the anchoring pin indicated at 10' is of somewhat different form to that hereinbefore described and consists of a piece of wire bent to a U shape, the bent portion being received in the horizontal passage 5 of the tooth and the locking pin 11 passing within the said bent portion as shown.

In Fig. 6 the invention is shown applied to a molar tooth the anchoring pin 10 being secured by the locking pin 11 in a similar manner to that hereinbefore described. The communicating passages 3 and 5 will usually be arranged approximately perpendicular to each other but in some instances as in the molar tooth shown in Fig. 6 for example, they may meet at an acute angle this being a variation included within the scope of the invention.

The teeth shown in Figs. 1 and 6 of the drawing are preferably put upon the market for sale to mechanical dentists with the anchoring and locking pins attached, in which case the locking pin is preferably secured in position in the cavity 3 by suitable cement so as to prevent any of the parts being lost.

We claim as our invention:

1. In an artificial denture, a backing, an artificial tooth having an opening formed on the back or lingual surface thereof which is closed by the backing when the tooth is secured thereto, an anchor adapted to be partially embedded in the backing and projecting into said opening when the tooth is in place on the backing, and a removable locking pin located in a second passage in the tooth and passing through the anchor.

2. In an artificial denture, a backing, an artificial tooth having an opening formed in the lingual surface thereof which is closed by the backing when the tooth is in place thereon, a bifurcated anchor having its bifurcated end embedded in the backing and adapted to project into the opening in the tooth, and a removable locking pin located in a second passage of the tooth and passing through the anchor, said anchor adapted to be locked to the tooth by the pin, prior to mounting the tooth on the backing.

3. In an artificial denture, an artificial tooth having an opening formed in the lingual face thereof and a passage extending at an angle thereto and intersecting said passage, an anchor projecting into the lingual opening, a pin located in said passage and engaging the anchor to lock it to said tooth, and a backing in which the projecting portion of the anchor is embedded during the operation of securing the tooth thereto, said backing being arranged to close the open end of said passages.

In testimony whereof we have hereunto subscribed our names this 20th day of December 1911.

DAVID WILLIAM BLUNDELL.
JOHN HENRY MILLS.
ALFRED THOMAS MAGUIRE.

Witnesses:
 EUSTACE H. BARKER,
 ARTHUR T. WAGHORN.

Copies of this patent may be obtained for five cents each, by addressing the "Commissioner of Patents, Washington, D. C."